Feb. 23, 1937. T. P. KOUVALLIS 2,071,467
GREASE FILTER
Filed June 17, 1936
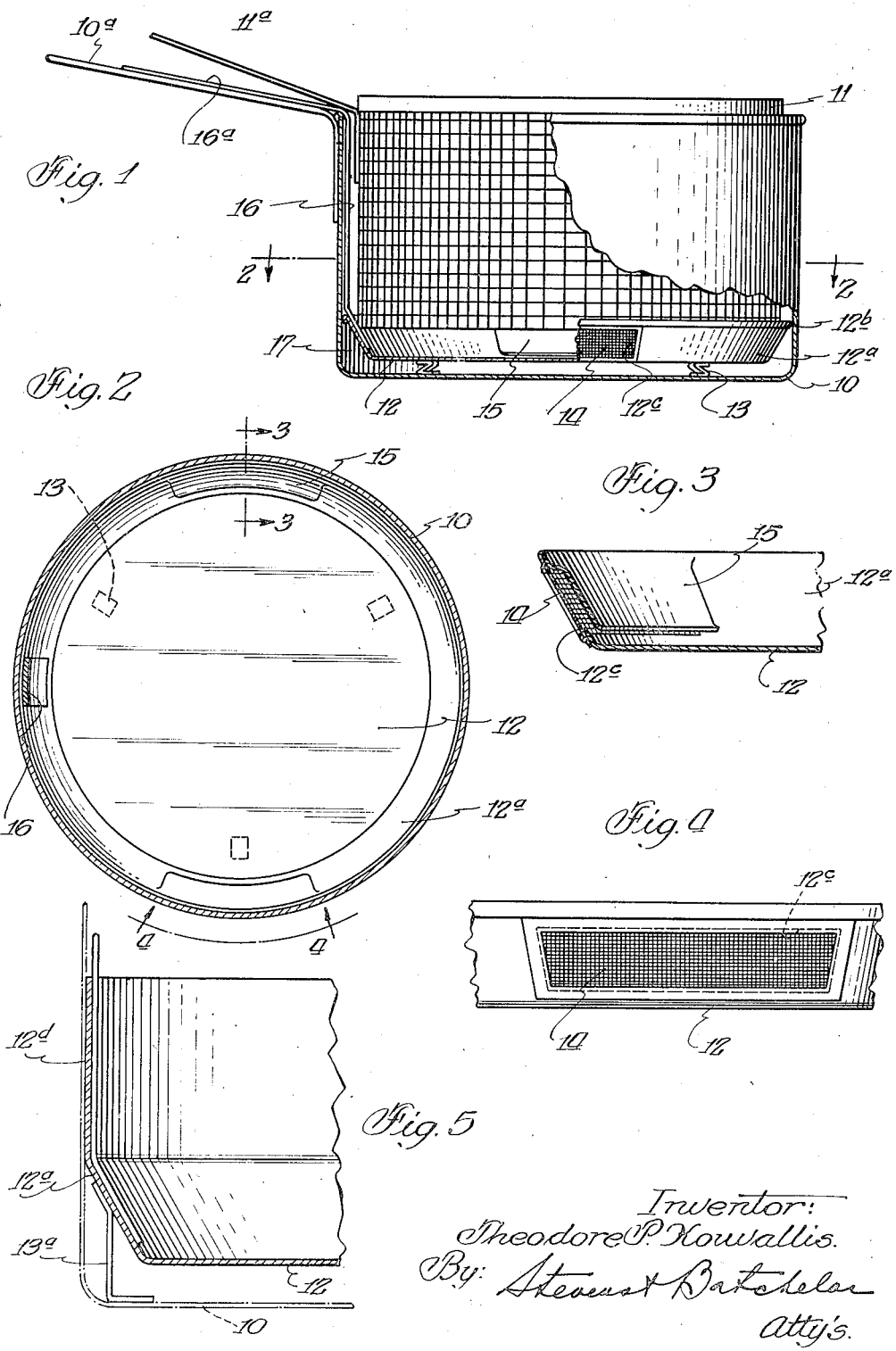
Inventor:
Theodore P. Kouvallis.
By Stevens & Batchelor
Atty's.

Patented Feb. 23, 1937

2,071,467

UNITED STATES PATENT OFFICE 2,071,467

GREASE FILTER

Theodore P. Kouvallis, Chicago, Ill., assignor of one-half to Harry H. Sellas, Chicago, Ill.

Application June 17, 1936, Serial No. 85,799

4 Claims. (Cl. 53—7)

My invention relates to vessels in which deep frying is done, and more particularly to appliances for keeping the grease clear of sediment and solid accumulations, and my main object is to provide an appliance of this kind which is simple and easily handled.

A further object of the invention is to provide a device in the nature of a collecting tray to catch falling particles from foods being fried and to keep such particles from being burned or charred.

A still further object of the invention is to provide a device which retains food particles and sediment in a position away from the bottom of the frying vessel, so that the discoloration of such particles from intense heat and the pollution of the frying liquid in consequence are avoided.

An important object of the invention is to design the novel device along simple and inexpensive lines and to be readily adaptable to the conventional variety of frying vessels.

With the above objects in view, and any others which may suggest themselves from the description to follow, a better understanding of the invention may be had by referring to the accompanying drawing, in which:—

Fig. 1 is an elevation of a typical frying vessel, partly broken away, showing the novel grease filter installed;

Fig. 2 is a section on the line 2—2 of Fig. 1;

Figs. 3 and 4 are respectively, enlarged detail sections on the lines 3—3 and 4—4 of Fig. 2; and Fig. 5 is an enlarged fragmental section of a modification.

A problem constantly contended with in the kitchens of restaurants and lunch rooms is the maintenance of frying vessels and their contents in proper condition. The frying of potatoes, potato chips, doughnuts, and the like causes crumbs, chips and odd particles to fall from the food to the bottom of the frying vessel. The intense heat of the vessel bottom causes the particles to become burned or charred, and results in the discoloration of the fat, particularly in the bottom of the vessel. Besides, this portion of the fat becomes adulterated with the sedimentary matter in solution and suspension, assuming a dark color and an unsavory appearance. If the fat is to be kept in proper condition, the greater part of it must be drained off and saved, and the portion in the bottom of the vessel discarded. This task involves extra time and effort; and the frequent loss of a portion of the fat increases the cost of deep frying. It has therefore been my purpose to eliminate the extra attention for the purpose of keeping the fat in proper condition, and to provide the novel grease filter as an expedient to conserve all of the fat in the frying vessel.

In accordance with the foregoing, specific reference to the drawing indicates a typical deep frying vessel at 10. Usually, a basket 11 is deposited in the vessel as a container for the articles to be fried, the basket having a handle 11a to facilitate the removal of the food when required. The basket 11 ordinarily depends partway into the vessel, although it may be considerably deeper, as indicated in the drawing. However, the basket is some distance above the bottom of the vessel.

My invention generally consists of a tray 12 having a general formation of a pie tin. Thus, the side wall 12a of the tray is flared, and the rim 12b thereof is preferably beaded or otherwise reinforced. The diameter of the tray is such as to make a smooth sliding fit with the wall of the vessel as it is lowered into the same. The tray is formed with three or more feet 13 attached to its bottom in order to raise it from the bottom of the vessel 10. Also, the side wall of the tray is formed with two or more openings 12c a short distance above the bottom of the tray, such openings being elongated laterally and covered with framed screens 14. On the inner side of these, the tray is formed with spaced flanges 15, these extending in parallelism to the tray walls and terminating a short distance from the bottom of the tray. At one side the wall of the tray receives a lifting handle 16 which extends with a deflected section 16a at the top, such section taking an outward course over the handle 10a of the vessel, so as to be conveniently grouped with the latter.

When the frying vessel is equipped with the novel grease filter, the fat not only separates the tray 12 from the bottom of the vessel 10, but also freely enters the tray by way of the marginal surrounding space indicated at 17 and the screened openings 14. However, all particles, chips or crumbs falling from the food drop directly into the tray 12, and the close spacing of the latter to the walls of the vessel prevents any sediment from falling into the bottom of the latter. Thus, no sediment accumulates on the bottom of the vessel to be burned or charred and to contaminate the portion of the fat which is contained therein. Since the tray 12 does not receive the direct heat from the fire, the accumulations therein receive only frying heat and therefore suffer no change or deteriorating influence. Therefore, the fat in the region of the vessel bottom is not adulterated, contaminated or discolored, and may be used over and over. It is only necessary to lift out the tray at the end of each day to discard the accumulations in the same.

While the screened passages 14 permit the fat to communicate freely from the vessel to the tray, it is significant that the flanges 15 form shields or deflectors to divert falling particles into the tray, so that the filter may be considered as highly efficient from the viewpoint of confining all sedimentary matter in the tray.

In the case of large vessels, it may be preferable to use the modification of Fig. 5. Here the tray is extended with a high side wall 12d, to assume the form of an inner vessel; and the feet 13a are extended from the wall 12a instead of from the bottom of the tray, in order to afford greater stability.

It will be evident from the above description that I have provided an article of extreme simplicity and marked utility for the purpose contemplated. The device may be manufactured cheaply and handled with facility by any kitchen attendant. Also, it is readily adaptable to existing types of deep frying vessels and suitable to be made in the two or three standard sizes thereof. The material for the device may be stamped or sheet metal, and preferably stainless steel for purposes of sanitation. While I have illustrated and described the device along specific lines, the same is clearly susceptible of minor changes and refinements, and I consider all such changes and refinements as coming within the scope and spirit of the appended claims.

I claim:—

1. A grease filter for frying vessels comprising a tray adapted to be deposited in the vessel in spaced relation to the bottom thereof, the tray being dished and with a perforation in its side wall, and a flange depending from the rim of the tray in spaced relation to the inner side of said side wall and opposite the perforated portion thereof.

2. A grease filter for frying vessels comprising a tray adapted to be deposited in the vessel in spaced relation to the bottom thereof, the tray being dished and with a perforation in its side wall, and a deflector on the inner side of the tray overhanging the perforated zone thereof and operative to lead objects falling on it into the tray.

3. A grease filter for frying vessels comprising a tray adapted to be deposited in the vessel in spaced relation to the bottom thereof, the tray having a solid bottom and sides perforated for the passage of the grease, and means to direct to the tray bottom solid particles falling from food floating in the grease at any point within the vessel walls.

4. A grease filter for frying vessels comprising a tray adapted to be deposited in the vessel in spaced relation to the bottom thereof, the tray having a solid bottom and a side wall flared to meet the wall of the vessel whereby to lead solid falling particles to the bottom of the tray, said side-wall having perforations for the passage of the grease, and means to deflect particles falling in the region of said perforations to the bottom of the tray.

THEODORE P. KOUVALLIS.